United States Patent [19]
Leonardi et al.

[11] Patent Number: 6,138,725
[45] Date of Patent: Oct. 31, 2000

[54] STUMP GRINDER TOOTH

[75] Inventors: Joseph A. Leonardi; Bruce C. Jordan, both of Auburn, N.Y.

[73] Assignee: Leonardi Manufacturing Co., Inc., Weedsport, N.Y.

[21] Appl. No.: 09/467,321

[22] Filed: Dec. 20, 1999

Related U.S. Application Data

[60] Provisional application No. 60/113,210, Dec. 22, 1998.

[51] Int. Cl.[7] .............................. B27C 1/00; A01G 23/06
[52] U.S. Cl. ......................... 144/235; 37/302; 144/24.12; 144/218; 144/241; 299/102
[58] Field of Search .................................. 144/24.12, 218, 144/223, 231, 235, 241; 37/301, 302; 407/46, 47, 48, 112, 113; 299/102, 108, 111

[56] References Cited

U.S. PATENT DOCUMENTS

| | | |
|---|---|---|
| 4,974,649 | 12/1990 | Manning ................................ 144/235 |
| 4,998,574 | 3/1991 | Beech et al. . |
| 5,135,035 | 8/1992 | Mills . |
| 5,497,815 | 3/1996 | Bowling . |
| 5,623,978 | 4/1997 | Clemenson .............................. 144/235 |
| 5,738,156 | 4/1998 | Stewart . |
| 5,743,314 | 4/1998 | Puch . |

*Primary Examiner*—W. Donald Bray
*Attorney, Agent, or Firm*—George R. McGuire; Hancock & Estabrook, LLP

[57] ABSTRACT

A two piece improved stump grinding tooth comprising a one piece cutting tooth having a hardened cutting bit, preferably made of tungsten carbide, or another material having hardness properties similar thereto, fixedly attached to the body portion of the tooth through brazing or other attachment process. The tooth body and tip are positioned at predetermined angles to improve the cutting characteristics of the tooth as it engages and removes material from a stump, and are held in the proper cutting position on the grinding wheel by a pair of mounting blocks through which the tooth body is secured to the grinding wheel.

11 Claims, 4 Drawing Sheets

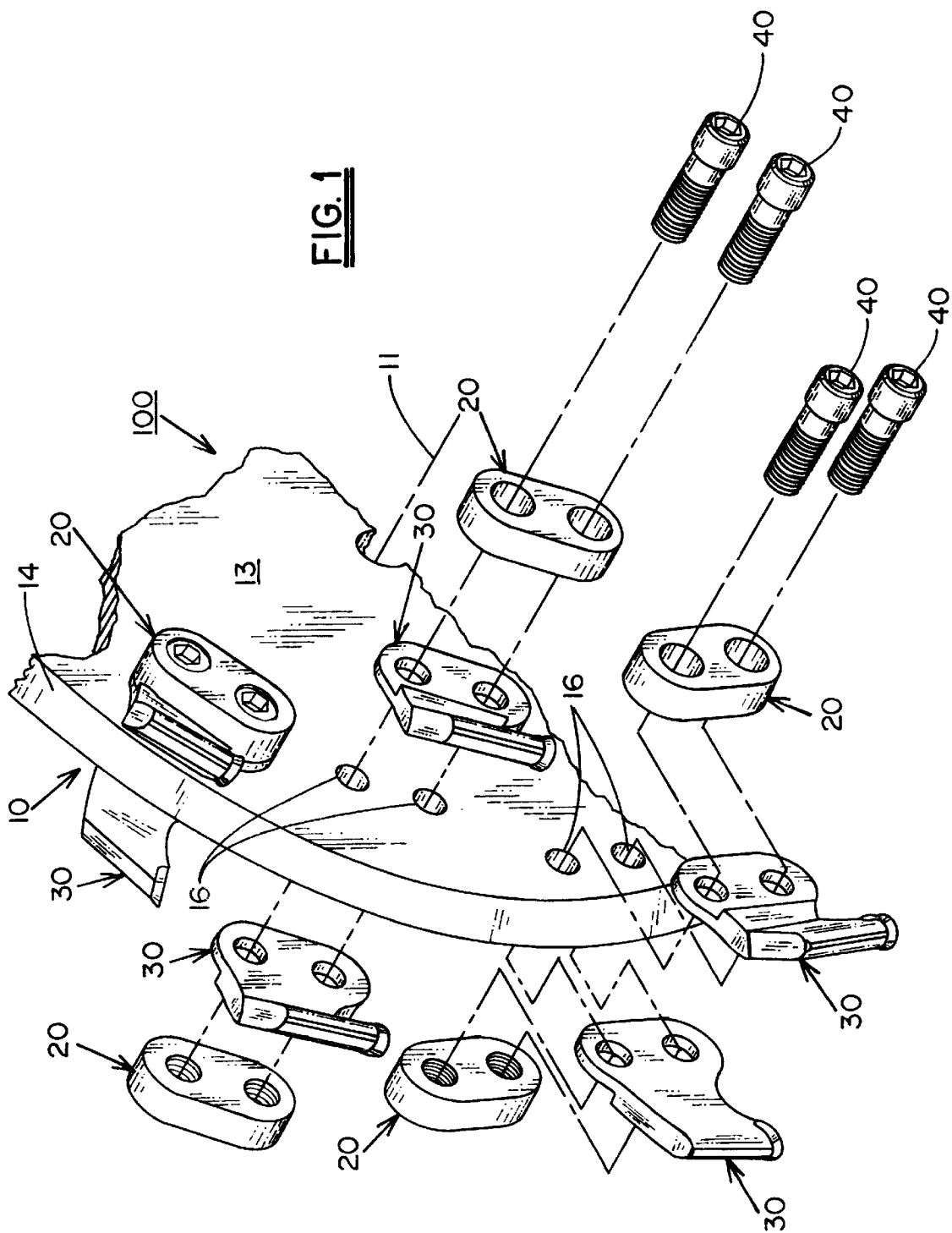

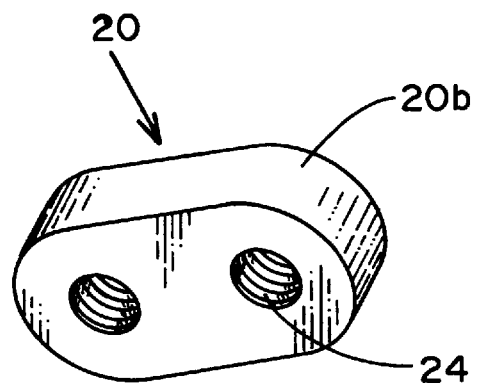
FIG. 8
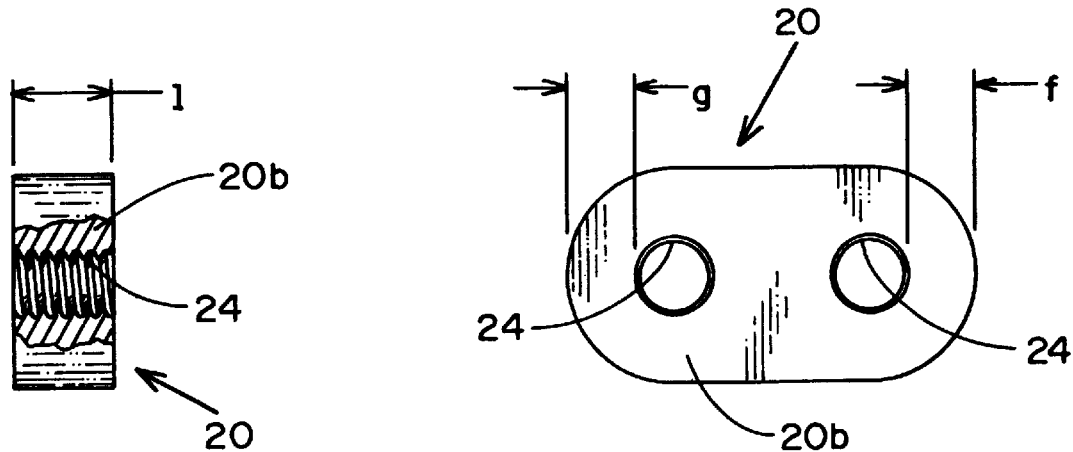
FIG. 10
FIG. 9

STUMP GRINDER TOOTH

This is a continuation-in-part of my prior U.S. Provisional Application Ser. No. 60/113,210 filed Dec. 22, 1998.

TECHNICAL FIELD

This invention relates generally to stump grinding apparatus and, more particularly, to an improved stump grinder tooth for cutting and removing tree stumps.

BACKGROUND ART

In the removal of tree stumps, it is well known to those skilled in the art that a grinding device including a large cutting wheel or disk is coupled to a drive motor for rotation about a central axis of the wheel. A plurality of cutting teeth are securely mounted around the periphery of the cutting wheel in complementary pairs with the cutting edge of each tooth extending radially outwardly from the edge of the wheel. The cutting or grinding teeth are typically secured to the cutting wheel by a pocket in which the shank of a tooth is secured, and the pocket is securely fastened to the wheel or disk by bolting thereto, thereby securely clamping the grinding or cutting teeth in the pocket and attached to the cutting wheel.

In operation, the cutting tooth bearing wheel is rotated about its central axis and brought into contact with a tree stump, causing the cutting edge of the cutting teeth to cut or chip away the stump material. By continuously sweeping the cutting wheel back and forth across the stump, the cutting teeth continuously remove the stump material.

During removal of the stump material, the reaction force exerted on each of the cutting teeth when the cutting wheel is engaging the stump material is in a direction that extends perpendicularly into the cutting edge of each cutting tooth, and tangential to the wheel and teeth mounted thereto. Accordingly, it is very important to secure the tooth to the cutting wheel, and to provide the tooth with sufficient strength to guard against breakage.

When a conventional tooth and pocket combination is utilized, it has been found that on occasion a tooth can be pulled from its clamped position within the tooth-receiving pocket. In addition, such tooth and pocket combinations generally require that the positioning of the tooth within the pocket be gauged so that the cutting surface of the tooth is properly positioned relative to the periphery of the cutting wheel when the pocket is secured thereto.

It is, therefore, an object of this invention to improve stump grinder teeth construction.

Another object of this invention is to eliminate the necessity for gauging a cutting tooth in a cutting tooth holder.

A further object of this invention is to increase the wear characteristics of the grinding tooth components.

Yet another object of this invention is to more securely attach the cutting tooth to the grinding wheel to minimize occasions of the cutting tooth being thrown from the grinding wheel.

DISCLOSURE OF THE INVENTION

These and other objects are attained in accordance with the present invention wherein there is provided a two-piece improved stump grinding tooth comprising a one piece cutting tooth having a hardened cutting bit, preferably made of tungsten carbide, or another material having hardness properties similar thereto, which is fixedly attached to the body portion of the tooth through brazing or other attachment process. The tooth body and tip are positioned at predetermined angles to improve the cutting characteristics of the tooth as it engages and removes material from a stump, and are held in the proper cutting position on the grinding wheel by a pair of mounting blocks through which the tooth body is secured to the grinding wheel.

BRIEF DESCRIPTION OF THE DRAWINGS

Further objects of this invention, together with additional features contributing thereto and advantages occurring therefrom, will be apparent from the following description of a preferred embodiment of the present invention which is shown in the accompanying drawings with like reference numerals indicating corresponding parts throughout and which is to be read in conjunction with the following drawings wherein:

FIG. 1 is a partial exploded perspective view of a stump grinding apparatus incorporating the improved stump cutting tooth;

FIG. 8 is a perspective view of a complimentary clamp member;

FIG. 9 is a side profile view of the clamp member illustrated in FIG. 8; and

FIG. 10 is an end view of the clamp member as illustrated in FIG. 9.

BEST MODE FOR CARRYING OUT THE INVENTION

Figure 3:
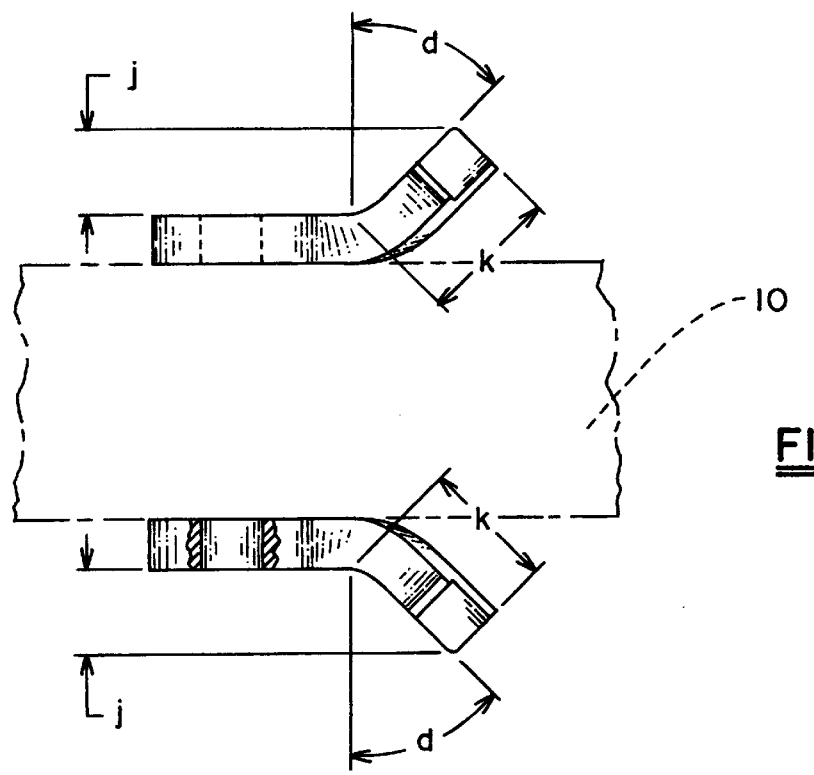
FIG. 3 is a top planar view of the body portion of a complimentary pair of stump grinding teeth as they are positioned on a grinding wheel.

Referring now to the drawings, there is shown in FIG. 1 a partial perspective exploded view of a stump grinding apparatus 100. The stump grinder 100 includes a large disk or inertia wheel 10 mounted on a central axis 11 for rotation. The wheel 10 is conventional in stump grinding apparatus, and includes opposed parallel planar faces 13, bridged by a peripheral edge 14. The grinding wheel 10 includes several spaced pairs of holes 16 circumferentially spaced about the wheel 10 at predetermined positions relative to the peripheral edge 14. These holes properly position each one of a complementary pair of cutting teeth 30 relative to the periphery of the wheel 10. A pair of cutting teeth 30 are secured to the grinder wheel 10 by means of a pair of cap screws 40 which secure the cutting teeth 30 to the grinder wheel 10 by means of a pair of mounting blocks 20.

As best illustrated in FIG. 1, the pair of bolts or cap screws 40 are inserted through one of the mounting blocks 20a, the cutting tooth 30, the holes 16 formed in the grinder wheel, the complementary grinding tooth 30, and are threadingly engaged with a second mounting block 20b. In this manner, when the bolts or cap screws 40 are torqued tight, the clamping force between the two mounting blocks 20 will securely fasten the grinding teeth 30 to the grinder wheel 10.

Figure 2:
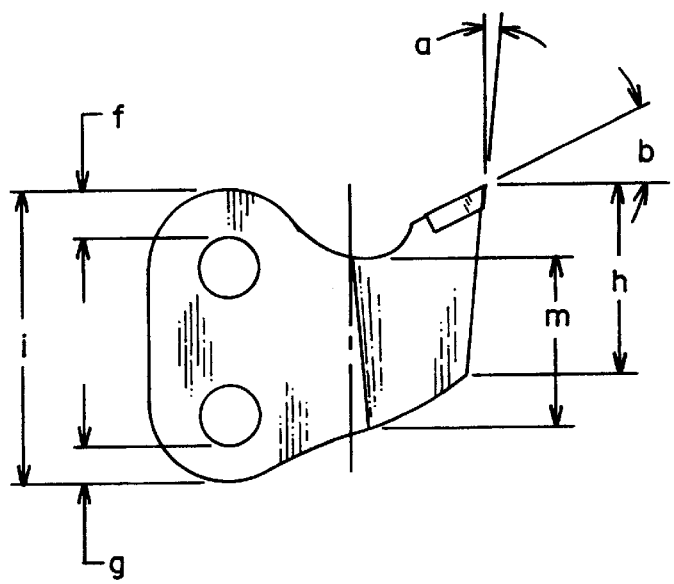
FIG. 2 is a side profile view of the body of the stump grinding tooth.
Figure 4:
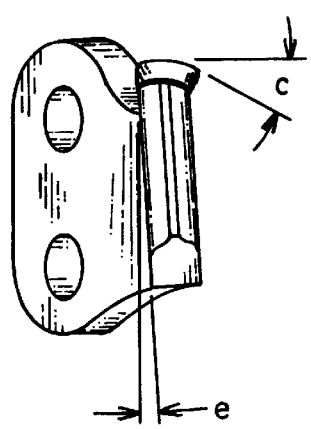
FIG. 4 is a frontal view of the improved cutting tooth illustrated in FIG. 2 to better illustrate the relative angles of portions thereof.
Figure 5:
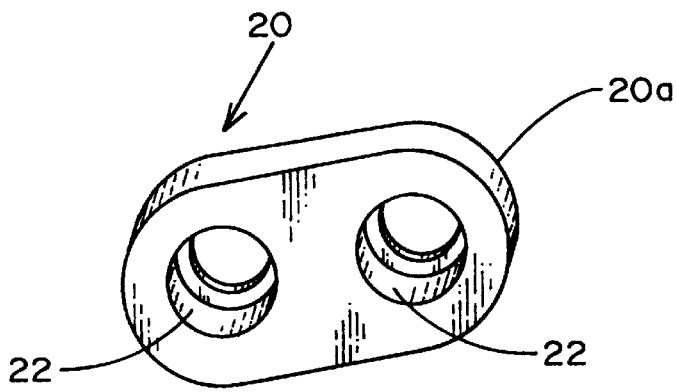
FIG. 5 is a frontal prospective view of one of the clamp members for securing the tooth to a grinding wheel.
Figure 7:
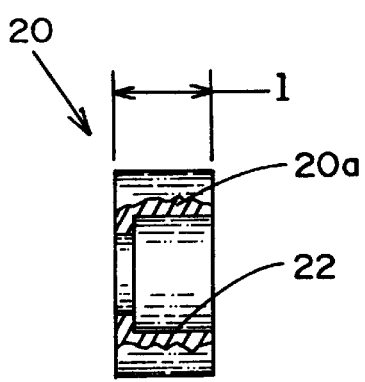
FIG. 7 is a sectional view of the clamp member illustrated in FIG. 6 taking along lines 7—7.

By directly bolting the teeth 30 to the holes 16 in the grinding wheel 10 the grinding teeth 30 are attached in the desired position for operation and, therefore, eliminates the necessity for gauging which is required when a grinding tooth and grinding tooth pocket combination is used. The particular manner in which the grinding teeth 30 are constructed, permits the teeth to be reversible at lead positions on the grinding wheel. Accordingly, a grinding tooth 30 can be placed on either side of the grinding wheel 10 to be used as a cross-over tooth. The configurations of the grinding teeth 30 are best described with reference to the drawings of FIGS. 2–4, in combination with the following table wherein each of the particular angles identified are described both in terms of a preferred embodiment and a preferential range for each of the particular angles described.

| Angle | Preferred Embodiment | Preferential Range | Description |
|---|---|---|---|
| "A" | 0–5 | 0–10 | Top Clearance Angle |
| "B" | 15–25 | −10–75 | Top Rake Angle |
| "C" | 10–15 | −10–75 | Side Rake Angle |
| "D" | 40–45 | 30–50 | Form Angle |
| "E" | 2–6 | 1–75 | Side Clearance Angle |

Figure 6:
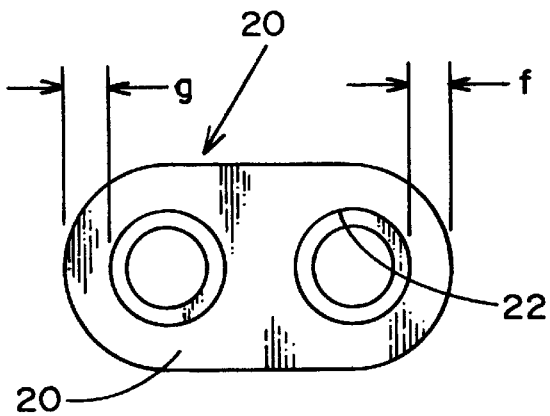
FIG. 6 is a planar side view of the clamp member of FIG. 5.

It should also be noted that in the preferred embodiment, the dimension "F" is greater than the dimension "G", because in normal operation the load applied at "F" is in tension, and the load applied at "G" is in compression. This is also the reason for the difference in the dimensions "F" and "G" illustrated with reference to the mounting blocks 20 as shown in FIGS. 6 and 9. The overall height of the tooth base, "I", is limited only by the grinding wheel bolt pattern, the holes 16, so that adjacent grinding teeth 30 secured in the holes 16 on the same planar face 13 of the grinding wheel 10 do not interfere with an adjacent grinder tooth positioned in an adjacent hole pair 16.

It should be noted that it is intended that a maximum amount of material be under a tungsten carbide tip portion 35 to prevent shearing. The tip portion 35 is a hardened cutting bit preferably composed of tungsten carbide or another material having hardness properties similar thereto, which is fixedly attached to the grinder tooth body by brazing or other attachment process. The cutting bit 35 is positioned on the tooth body to contact a stump when the grinding wheel 10 is rotating, thereby effecting a downward force on the stump. The dimension of the shank portion "M" of the grinding tooth is sized to prevent breakage at the clamp as in a normal two-piece combination known to those skilled in the art. Similarly, the dimensions "K" and "D" which create the amount of side reach, "J", are limited by the clearance between the grinding wheel and the frame in which the grinding wheel is mounted to prevent the teeth from coming into contact with the machine frame. This clearance, "J", determines the maximum thickness for the mounting blocks 20, "L", while the minimum thickness of the mounting blocks 20 would be dependent upon the head height of the bolt or cap screw 40 or the thread engagement of the threaded portion of the cap screw.

The pair of mounting blocks 20a and 20b which are used to secure the grinding teeth 30 to the grinding wheel 10 are best illustrated in FIGS. 5–7 and FIGS. 8–10, respectively. Except for the difference in the dimensions "F", "G" and "L", the mounting blocks are similar to a standard block, without a tooth locating slot, as used in securing grinding teeth to a grinding wheel. The mounting block 20a is formed with a recess 22 for receiving the head of a cap screw 40, and the mounting block 20b is formed with internal threads 24 for receiving the threaded portion of the cap screws 40.

In operation, a pair of grinding teeth 30 are positioned on adjacent sides of the grinding wheel 10 at the positioning holes 16. A pair of mounting blocks 20 are positioned adjacent thereto, and the cap screws 40 inserted through mounting block 20a, the grinding teeth 30 positioned on each side of the grinding wheel 10, and threadingly engaged with the mounting block 20b. The cap screws 40 are torqued tight to secure the cutting teeth 30 to the grinding wheel 10. By securing the grinding teeth 30 to the grinding wheel 10 at a position determined by the holes 16, the grinding teeth are properly positioned relative to the grinding wheel 10 for engaging a stump, without requiring the cutting tooth to be gauged as is necessary when a cutting tooth-cutting tooth pocket combination is used. In addition to eliminating the necessity for gauging the cutting tooth, this design permits different heat treatments for the tooth components, thereby resulting in better wear resistance and permitting the use of harder and more rigid materials where structural bending is not required during fabrication in order to achieve the components function.

While this invention has been described in the specification and illustrated in the drawings with reference to a preferred embodiment, the structure of which has been disclosed herein, it will be understood by those skilled in the art to which this invention pertains that various changes may be made and equivalents may be substituted for elements of the invention without departing from the scope of the claims. Therefore it is intended that the invention not be limited to the particular embodiment disclosed in the specification and shown in the drawing as the best mode presently known by the inventor for carrying out this invention, nor confined to the details set forth, but that the invention will include all embodiments, modifications and changes that may come within the scope of the following claims.

What is claimed is:

1. Stump cutting apparatus adapted for use in combination with a stump grinding apparatus having a stump grinding wheel, said stump cutting apparatus comprising:

a) a tooth having a head portion and a shank portion, said shank portion being of a predetermined shape and including a pair of opposing planar surfaces and at least two holes formed therethrough;

b) a mounting block of a predetermined shape corresponding to said predetermined shape of said tooth, and including at least one planar surface adapted to be positioned in essentially complete contacting relation to one of said opposing planar surfaces, and further including at least two holes formed therethrough, each one of which is adapted to be axially aligned with a corresponding one of said at least two holes formed through said tooth; and c) means for securely joining said tooth and said mounting block to said grinding wheel.

2. The stump cutting apparatus of claim 1, wherein said at least two holes formed through said mounting block are internally threaded.

3. The stump cutting apparatus of claim 1, wherein said at least two holes formed through said mounting block are counter-sunk.

4. The stump cutting apparatus of claim 1, and further comprising a cutting tip fixedly attached to said head portion.

5. The stump cutting apparatus of claim 4, wherein said cutting tip is composed of tungsten carbide.

6. The stump cutting apparatus of claim 4, wherein said cutting tip is positioned on said head portion at a predetermined top clearance angle, top rake angle, side rake angle, form angle and side clearance angle.

7. The stump cutting apparatus of claim 6, wherein said top clearance angle is in the range of 0–5 degrees, said top rake angle is in the range of 15–25 degrees, said side rake angle is in the range of 10–15 degrees, said form angle is in the range of 40–45 degrees, and said side clearance angle is in the range of 2–6 degrees.

8. The stump cutting apparatus of claim 1, wherein said predetermined shape of said shank portion and said mounting block includes a substantially oval shaped periphery defined by said planer surfaces through which said at least two holes are formed.

9. The stump cutting apparatus of claim 1, wherein said means for joining said tooth and said mounting block to said grinding wheel includes a predetermined number of cap screws corresponding to the number of said at least two holes formed through said tooth.

10. A tooth for attachment to a stump grinding apparatus, said tooth comprising:

a) a head portion and a shank portion integrally joined to one another; and b) a cutting tip securely attached to said head and being positioned at a predetermined top clearance angle, top rake angle, side rake angle, form angle and side clearance angle with respect thereto, wherein:

i) said top clearance angle is in the range of 0–10 degrees;

ii) said top rake angle is in the range of 10–75 degrees;

iii) Said side rake angle is in the range of 10–75 degrees;

iv) said form angle is in the range of 30–50 degrees; and v) said side clearance angle is in the range of 1–75 degrees.

11. The stump cutting apparatus of claim 10, wherein said top clearance angle is in the range of 0–5 degrees, said top rake angle is in the range of 15–25 degrees; said side rake angle is in the range of 10–15 degrees; said form angle is in the range of 40–45 degrees; and said side clearance angle is in the range of 2–6 degrees.

* * * * *